United States Patent [19]

Anderson et al.

[11] Patent Number: 5,219,598
[45] Date of Patent: Jun. 15, 1993

[54] REDUCING SUGAR-CONTAINING MIX AND PROCESS THEREFORE

[75] Inventors: Noel E. Anderson, Brookfield; John B. Russell, Trumbull, both of Conn.

[73] Assignee: Kraft General Foods, Inc., Northfield, Ill.

[21] Appl. No.: 793,066

[22] Filed: Nov. 15, 1991

[51] Int. Cl.⁵ ............................................. A23L 2/38
[52] U.S. Cl. ........................... 426/96; 426/289; 426/292; 426/591
[58] Field of Search ............... 426/590, 591, 285, 289, 426/292, 291, 96

[56] References Cited

U.S. PATENT DOCUMENTS

| | | | |
|---|---|---|---|
| 3,888,998 | 6/1975 | Sampson | 426/591 |
| 4,199,610 | 4/1980 | Hughes et al. | 426/590 |
| 4,278,695 | 7/1981 | Velasco | 426/289 |
| 4,343,819 | 8/1982 | Wood | 426/591 |
| 4,541,873 | 9/1985 | Schenz et al. | 127/46.1 |
| 4,579,742 | 4/1986 | Lavie | 426/591 |
| 4,664,920 | 5/1987 | Saleeb et al. | 426/74 |
| 4,716,046 | 12/1987 | Lavie | 426/591 |
| 4,737,368 | 4/1988 | Batterman et al. | 426/96 |
| 4,769,244 | 9/1988 | Lavie | 426/96 |
| 4,853,237 | 8/1989 | Prinkkila | 426/74 |

Primary Examiner—Carolyn Paden
Attorney, Agent, or Firm—Thomas R. Savoie

[57] ABSTRACT

A dry mix, such as a fructose-containing beverage mix, is prepared by coating the fructose particles with fine particles of a food acid. The coated fructose particles are resistant to browning which can develop in the presence of heat and moisture, especially if any alkaline ingredients are contained in the mix.

21 Claims, No Drawings

REDUCING SUGAR-CONTAINING MIX AND PROCESS THEREFORE

This invention relates to an improved, dry, food mix containing one or more reducing sugars, such as fructose, and a method for its preparation.

Dry beverage mixes containing sweeteners, food acid, flavor, color and flow agent are well known. Generally, the primary sweetener in beverages has been sucrose or intensive sweeteners, such as aspartame, saccharine or the like.

While sucrose is effective to sweeten foods, dietary considerations have recently inspired a reduction in the sucrose and/or total sugar content of some presweetened foods, especially beverages. To provide traditional levels of sweetness at reduced weight concentrations, sweeteners having more sweetening power per unit weight than sucrose (i.e. having higher relative sweetness) must be employed. While certain high-potency, non-nutritive or nutritive sweeteners have been suggested for use, both current food regulations and strong consumer prejudice against artificial sweeteners have directed art attempts at providing presweetened beverage mixes employing only nutritive, carbohydrate sweetening agents.

Since fructose is 10%-17% sweeter than sucrose on an absolute basis and about 30% sweeter than sucrose in a 50/50 mixture, many attempts have been made to employ fructose as a sweetening agent for foods. Fructose is commercially available in basically two forms, (1) high fructose corn syrup, (hereinafter "HFCS") normally a liquid, and (2) crystalline fructose which is a solid powder.

HFCS has the advantage of being relatively inexpensive compared to crystalline fructose and has been employed by soft drink manufactures to reduce the cost of their carbonated beverages. Use of HFCS as a major component for presweetened dry beverages is not practical since the 20% moisture content of the HFCS results in a sticky, caked, dry food mix.

Another problem with HFCS is that it is not as sweet as crystalline fructose. Fructose exists mostly in four forms as the alpha-furano, beta-furano, alpha-pyrano and beta-pyrano structures. The sweetness perception of fructose is, however, primarily a function of the amount of beta-pyrano form. Crystalline fructose, is usually manufactured as theoretically-pure, anhydrous beta-D-fructopyranose for this reason (although typical analysis indicate only 97.2% beta-pyranose). HFCS, on the other hand, is not as sweet as pure crystalline fructose since it is an amorphous mixture of the less sweet fructose forms as well as the sweeter form. HFCS also contains glucose which is less sweet than fructose. HFCS comprises only about 57%-70% of the sweeter beta-pyrano form (basis total fructose). Therefore, crystalline fructose is substantially sweeter on a dry weight basis than HFCS.

Although crystalline fructose is more expensive than sucrose, the higher sweetness level of crystalline fructose, as compared to sucrose, makes the substitution of fructose for sucrose in dry food mixes economically practical. However, crystalline fructose has some undesirable properties which can result in inferior dry food mixes. Crystalline fructose is significantly more hygroscopic than sucrose. Additionally, crystalline fructose will interact with other ingredients in the presence of heat and moisture to develop a brown color which detracts from the appearance of food mixes, such as powdered soft drink mixes.

The prior art contains examples of dry food mixes containing monosaccharides, acids, flavor and anti-caking agents.

U.S. Pat. No. 4,199,610 entitled "Non-hydroscopic Dry Instant Beverage Mixes" to Hughes et al., teaches the preparation of a dry, stable, acidulated beverage mix made by adding phosphoric acid to pulverized (instead of granular) sugar, such as pulverized fructose with a particle range of from 1–100 microns, then drying the phosphoric acid-sugar slurry and grinding the dry cake.

U.S. Pat. No. 4,664,920 entitled "Method for Fixing Food Ingredients on a Magnesium Salt Substrate" to Saleeb et al.; used magnesium salts to fix juice solids, flavors, colors and high fructose corn syrup.

U.S. Pat. No. 4,541,873 entitled "Method and Manufacture for easily Spray Drying Low Molecular Weight Sugars" to Schenz et al. teaches a method of complexing saccharides, including fructose, with metallic cations to improve resistance to humidity and improve flowability.

A quick-dissolving beverage mix is discussed in U.S. Pat. No. 4,343,819 entitled "Quick-Dissolving Powdered Drink and Method Therefore" to Wood et al., describes a dry beverage mix having carbonates bound to sucrose particles.

In U.S. Pat. No. 4,273,695 entitled "Preparing Beverage Mix Containing Dextrose Hydrate and Coated Citric Acid" to Velasco, a free-flowing beverage mix is prepared by coating particles of food acid with a desiccating agent such as silicon dioxide and then mixing the coated particles with the saccharide materials.

U.S. Pat. No. 4,737, entitled "Sweetener Composition" to Batterman et al., discloses a dry beverage mix containing both sucrose and fructose.

U.S. Pat. No. 4,769,244, entitled "Non-Hygroscopic Water-Soluble Pulverent Composition For The Preparation Of Drinks And Process For Its Preparation", discloses a dry, fructose-containing, effervescent beverage mix wherein the bicarbonate and food acid particles are coated with a film of xanthan gum. It has, however, not hereto been possible to produce a non-caking, fructose-containing beverage mix using commonly-available food ingredients and simple mixing techniques.

SUMMARY OF THE INVENTION

The present invention relates to dry food mixes containing a crystalline reducing sugar, such as fructose. The reducing sugar is present at a level of at least 5%, preferably at least 9%, by weight of the mix.

According to this invention the particles of crystalline reducing sugar may be plated with powdered, anydrous food-grade acid, such as citric acid, using a simple mixing technique. The powdered acid has a particle size distribution which is equal to or finer than 0% on 30 U.S. mesh, 10% on 40 U.S. mesh and 10% thru 100 U.S. mesh. Thereafter, other dry mix ingredients, including any water-soluble alkaline ingredient which may be present in the mix, can be blended with the acid-coated, crystalline reducing sugar.

By employing the teachings of this invention browning of the reducing sugar is dramatically reduced. It is believed that browning of a reducing sugar is accelerated by heat and moisture and will be further accelerated as a result of interactions with any alkaline compounds contained in the mix. The alkaline compounds may be present as a result of overt addition of these materials, (e.g. magnesium oxide, potassium bicarbonate, sodium bicarbonate) or as the product of an in situ reaction occurring within the mix during storage. It is believed that the browning reaction is retarded by keeping alkaline material away from the microenvironment of the reducing sugar. By physically separating alkaline materials from the reducing sugar, such as by means of an acid coating, the pH of the microenvironment of the reducing sugar is maintained at a more stable acid-to-neutral pH. Coating of the reducing sugar can be accomplished by simple mixing for an effective length of time, normally within two minutes. Powdered acid should be present at a level which is at least 2% by weight of the material being coated (i.e. the total material present in the mixer when the powdered acid is being mixed). In many commercial situations where the reducing sugar constitute only a minor fraction of the sugar present in the final mix, such as when the majority of the sugar is sucrose, it will be desirable to pre-blend the reducing sugar(s) with all or a portion of the non-reducing sugar(s) prior to blending with the powdered acid. The powdered acid will then coat all of the coarser sugar particles present in the mixer.

According to another embodiment of this invention a powdered, neutral, preferably water-insoluble compound, such as calcium carbonate, may be used as a spacer between the crystalline reducing sugar and any alkaline ingredients contained in the mix. Any such neutral spacing compound should preferably have a particle size equivalent to that of the acid particles used to coat the crystalline sugar particles. Neutral compounds are meant to include those compounds which are essentially insoluble in water or, if soluble, result in a solution pH, at 1% and 25° C., of less than 8, preferably 6 to 7.

DETAILED DESCRIPTION OF THE INVENTION

This invention is particularly well-suited for use in dry beverage mixes, such as fruit-flavored drink mixes, including lemonade mixes, but will be useful for other dry food mixes such as dry, fruit-flavored, dessert gel mixes, including gelatin mixes. The crystalline, reducing sugar-containing food mix of this invention may be produced with simple dry blending steps without need for any liquid coating and/or drying steps. The reducing sugar contained in the food mix will typically be fructose, but this invention may be utilized for other hexoses, as well as for pentoses, reducing disaccharides, oligosaccharides and combinations thereof.

The food mix will contain from 5% to 90% by weight of reducing sugar(s) and from 20% to 95%, preferably 40 to 90%, by weight of total sugars. Typically the combined weight of total sugars will be at least 60% of the dry mix, and for beverage mixes more typically at least 80%.

The powdered food acid used in this invention to coat the particles of reducing sugar is preferably an anhydrous, crystalline food acid. Suitable acids include citric, succinic, lactic, malic, tartaric, fumaric, and/or adipic. The particle size distribution of the acid will be equal to or finer than 0% on 30 U.S. mesh, 10% on 40 U.S. mesh and 10% thru 100 U.S. mesh, preferably with 97% minimum thru 60 U.S. mesh and most preferably with 50% minimum thru 100 U.S. mesh and 13% maximum thru 200 U.S. mesh. The powdered acid should be present at a level which is from at least 2%, preferably at least 4%, by weight of the material being coated.

In preparing a dry food mix, it may be possible to isolate the reducing sugar(s) and to blend only the reducing sugar and powdered acid. If this is done, any additional acid needed to complete the mix may be added in less expensive granular form. However, in situations where the mix contains about 65 to 90% sucrose and only about 5 to 35% of reducing sugar(s), plant operation may dictate that all the sugars be combined prior to mixing with the powdered acid. In such an event the powdered acid will typically be from 4 to 12% by weight of the total sugars contained in the mix.

It is believed that plating of the reducing sugar with powdered acid, in accordance with this invention, will prevent browning of the reducing sugar which would result from the reaction of strongly alkaline compounds, such as $Mg(OH)_2$, $NaOH$, $KOH$ and the like, and the less strong alkaline-forming compounds, such as sodium bicarbonate, with the reducing sugar. Hydroxide compounds can result from the break down of bicarbonates in the presence of ambient heat and moisture. For example the following known interaction can occur:

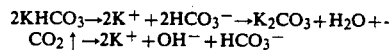
$$2KHCO_3 \rightarrow 2K^+ + 2HCO_3^- \rightarrow K_2CO_3 + H_2O + CO_2 \uparrow \rightarrow 2K^+ + OH^- + HCO_3^-$$

Simple dissociation of $KHCO_3$ results in a solution pH of about 8; whereas, formation and breakdown of $K_2CO_3$ produces a solution pH of about 11 to 12.

Plating the reducing sugar with acid prior to blending with alkaline compounds, such as bicarbonates, deters browning, since any hydroxyl ions produced are acid neutralized, and a neutral to acidic pH is maintained. Bicarbonate materials may be added to dry food mixes as $CO_2$-generators to facilitate the dissolution of the mixes in cold water. An example of this addition is disclosed in U.S. Pat. No. 4,343,819 to Wood et al. Examples of these alkaline $CO_2$-generators are sodium carbonate, sodium bicarbonate, sodium sesquicarbonate, potassium carbonate, potassium bicarbonate, ammonium carbonate and ammonium bicarbonate. Other alkaline materials, such as magnesium oxide, a known flow agent, would also cause adverse effects.

According to one embodiment of this invention the reducing sugar particles are coated with particles of powdered food acid, in a mixing operation; thereafter, other dry mix ingredients, including any water-soluble alkaline-generating or forming compounds, are added to the mixer. The stabilizing effect is believed to be the result of two factors: first, the low pH environment enhances the inherent stability of the reducing sugars and the acid coating physically prevents contact of the alkali with the reducing sugar; second, the acid-coated reducing sugar will neutralize any alkaline compounds formed due to heat, moisture or other abuses. These positive factors will increase shelf life and reduce, but not totally eliminate, the rate of browning, as the browning of reducing sugars has been seen to occur over time even in the absence of alkaline-generating or forming compounds. Presence of an alkaline microenvironment around the reducing sugar appears to greatly accelerates browning.

This invention is most useful in retarding browning of reducing sugars when alkaline materials are present in a dry food mix. However, the present invention can find use, such as in Example 3 below, where no alkaline compounds or alkaline-generating compounds are present to essentially eliminate browning over an extended period of time (e.g. 24 months).

According to another embodiment of this invention a preferably water-insoluble, acidic-to-neutral (as measured in a 1% solution at 25° C.), powdered spacer compound, such as calcium carbonate, titanium dioxide, calcium phosphate, silicon dioxide or the like, is present when the reducing sugar is mixed with the food acid. The powdered spacer may be mixed with the reducing sugar either before, during or after the time the acid component is combined with the reducing sugar. The level of the spacer compound will typically be at least 0.1%, preferably up to 3%, by weight of the sugars and other granular material contained in the mixer and which is to be coated by the powdered acid and spacer compound. The particle size distribution of the spacer compound will typically be comparable to the particle size of the powdered acid. Calcium carbonate is a preferred spacer compound since, although insoluble in water, it becomes soluble in acidic solutions, such as beverages, and thus reduce the presence of insoluble material in the beverage.

In situations, such as shown in Example 4, where there are no overtly-added alkaline materials, relatively high levels of a powdered spacer compound, typically 0.8% to 3% by weight of the materials contained in the mixer, may be used to provide resistance to browning. Meaningful resistance to browning will be obtained even in the absence of coating the reducing sugar with powdered citric acid.

A liquid, non-aqueous, food-grade binding agent may be applied to the surface of the reducing sugar which is to be coated with the powdered acid and/or spacer in order to improve adherence of the acid and/or spacer particles. This application could be by direct plating onto the reducing sugar or by plating onto a portion of the major component of the mix (e.g. sucrose) which is then blended with the reducing sugars and, if desirable, any remaining sugars. Plating may be effected by means such as spraying or blending. The binding agent, when used, will be at a level of less than 0.5%, typically less than 0.25%, by weight of the material being coated with the powdered acid. Preferred binding agents are polyhydric alcohols, mono-, di- and triglycerides, including acetylated monoglycerides, and mixtures thereof.

Other functional ingredients such as flow agents (e.g. magnesium oxide, silicon dioxide, etc.), buffers (e.g. trisodium citrate), anti-foaming agents (e.g. silicon), clouding agents, flavor agents, colors, vitamins and minerals may be included in the dry mix of this invention.

This invention is further illustrated but not limited by the following examples:

EXAMPLE 1

| Ingredient | Weight % |
|---|---|
| Sucrose | 80.6 |
| Fructose | 9.5 |
| Citric Acid | 7.5 |
| Spray-Dried Lemon Flavor | 0.94 |
| Calcium Carbonate | 0.51 |
| Sodium Bicarbonate | 0.51 |
| Potassium Bicarbonate | 0.17 |
| Magnesium Oxide | 0.14 |
| Clouding Agent | 0.08 |
| Vitamin C/Color | 0.06 |
| Acetylated Monoglycerides | 0.01 |

Acetylated monoglycerides were plated onto a small fraction of the sucrose (0.2% of mix) and this faction, the remainder of the sucrose and fructose were blended for 2 minutes in a ribbon blender. Powdered citric acid was then added to the blender and mixing was continued for an additional two minutes. Thereafter, the remainder of the ingredients were added to the mixer and mixing was continued for eight minutes. The powdered citric acid particle size was 100% through 20 U.S. mesh, 97% minimum through 60 U.S. mesh, 50% minimum through 100 U.S. mesh and 13% maximum through 200 U.S. mesh.

The resulting mix was placed into polyethylene bags, 2 mils thick, and stored at 70° F./50% R.H. After nine months, no browning was visible. This Example demonstrates the utility of this invention in fructose-containing dry mixes which contain overtly-added alkaline material.

EXAMPLE 2

A control mix having the same formulation as in Example 1 but using fine granular citric acid (0% on 30 U.S. mesh, 10% maximum on 40 U.S. mesh and 10% maximum thru 100 U.S. mesh) in place of the powdered citric acid and using a mix sequence which reversed the order and mixing times of the citric acid and the remaining ingredients showed browning after only two months storage under the same conditions.

When the control mix was used to prepare a liquid beverage after about three months of storage, as identified above, the beverage has the appearance of having been made with rusty water. In comparison, the beverage mix of this Example with powdered citric acid has been combined with water to make a beverage having no off color after 18 months of the aforementioned storage.

EXAMPLE 3

A sucrose formulation was made by replacing the fructose with sucrose in the formula recited in Example 1 and using fine granular (particle size set forth in Example 2) citric acid in place of the powdered citric acid. This sucrose formula was prepared by mixing the sucrose premix with the remaining sucrose for two minutes, adding the rest of the ingredients, except for the citric acid, and mixing for 2 minutes and finally adding the fine granular citric acid and mixing for 8 minutes. This sucrose mix was then used in a browning comparison against the powdered citric acid and fine granular citric acid formulae of Examples 1 and 2. The three mixes were each stored in glass jars at 110° F./70% R.H. and evaluated for color darkening utilizing the well known Hunter L value (0=black, 100=white). The results over time are as set forth in the following table.

| Mix | Time (hrs.) | Hunter L Value |
|---|---|---|
| Example 1 | 0 | 90.2 |
| (invention) | 44 | 89.4 |
| (powdered CA) | 68 | 88.5 |
|  | 148 | 87.8 |
|  | 171 | 88.4 |
| Example 2 | 0 | 90.2 |
| (control) | 44 | 86.9 |
| (granular CA) | 68 | 81.9 |
|  | 148 | 79.1 |
|  | 171 | 79.2 |
| Example 3 | 0 | 90.4 |
| (sugar formula) | 44 | 89.0 |
|  | 68 | 89.9 |
|  | 148 | 89.3 |

-continued

| Mix | Time (hrs.) | Hunter L Value |
|---|---|---|
| | 171 | 88.5 |

As can be seen from the table, this invention is able to make dry, alkaline-containing mixes containing both sucrose and fructose as stable as mixes containing only sucrose.

EXAMPLE 4

| Ingredient | Weight % |
|---|---|
| Sucrose | 81.8 |
| Fructose | 9.1 |
| Powdered Citric Acid (per Example 1) | 6.5 |
| Spray-Dried Lemon Flavor | 1.0 |
| Calcium Carbonate Powder | 0.8 |
| Trisodium Citrate | 0.45 |
| Silicon Dioxide | 0.15 |
| Clouding Agent | 0.08 |
| Flavor/Color | 0.07 |
| Vitamin C | 0.06 |
| Acetylated Monoglycerides | 0.01 |

Acetylated monoglycerides were plated onto a small fraction (0.2%) of the sucrose. This coated sucrose the remaining sucrose and the fructose were then mixed in a ribbon blender for two minutes. The remaining ingredients, except for the powdered citric acid, were then added and mixed for two minutes. Finally, the powdered citric acid was added and mixed for eight minutes. This mix was sealed in paper/foil/polyethylene pouches and evidenced no browning after seven months storage at 90° F. or after 22 months storage at 70° F.

As demonstrated by this Example 4, the mix sequence can be altered (i.e., citric acid added last) when the mix does not contain overtly-added alkaline material.

By eliminating or minimizing the presence of strongly alkaline materials, it is also possible to both alter the mix sequence (i.e., citric acid added last) and to use a coarser sized food grade acid. Thus, if fine granular citric acid (i.e., 0% on 30 U.S. mesh, 10% maximum on 40 U.S. mesh and 10% maximum thru 100 U.S. mesh) is used in the powdered calcium carbonate-containing formulation of this Example 4, in place of powdered citric acid, browning of the fructose is still retarded and a longer shelf-life for the mix is obtained. This contrasts to the control mix of Example 2 wherein, using both the altered mix sequence and fine granular citric acid in the presence of alkaline materials, the result was browning of the mix after only two months at 70° F.

Having thus described the invention what is claimed is:

1. A method for improving the shelf-stability of a dry food mix containing a crystalline reducing sugar comprising the steps of:
   (a) mixing the crystalline reducing sugar with a sufficient quantity of crystalline, anhydrous, powdered food acid for a period of time effective to surface coat the particles of reducing sugar with the acid, said acid having a particle size distribution which is equal to or finer than 0% on 30 U.S. mesh, 10% on 40 U.S. mesh and 10% thru 100 U.S. mesh, wherein coating of the reducing sugar with the acid is effected either by dry blending the reducing sugar and the acid or by applying a liquid non-aqueous binding agent to the surface of the reducing sugar prior to dry blending the reducing sugar and the acid; thereafter,
   (b) mixing the acid-coated reducing sugar with any water-soluble, alkaline ingredient to be contained in the food mix that would adversely interact with uncoated reducing sugar;
   (c) packaging the food mix in a moisture-proof container;

with the proviso that when the mix does not contain alkaline ingredients and the acid used to coat the reducing sugar is coarser than 97% minimum through 60 U.S. mesh and 50% minimum through a 100 U.S. mesh, then the mix contains from 0.8 to 3% of powdered, water-insoluble spacer compound based on the weight of mix present when spacer compound is added to the mix.

2. The method of claim 1 wherein the reducing sugar is selected from the group consisting of fructose, pentose(s) and combinations thereof.

3. The method of claim 1 wherein the mix also contains sucrose.

4. The process of claim 3 wherein sucrose is mixed with the reducing sugar before the food acid is mixed with the reducing sugar.

5. The process of claim 3 wherein a liquid, non-aqueous, food-grade binding agent is plated onto with a portion of the sucrose before this coated-sucrose is mixed with the reducing sugar and the remaining sucrose.

6. The process of claim 5 wherein the liquid, non-aqueous binding agent is selected from the group consisting of edible polyhydric alcohols, mono-, di-, and triglycerides and mixtures thereof.

7. The process of claim 5 wherein the binding agent consists of acetylated monoglycerides.

8. The process of claim 1 wherein the food acid is selected from the group consisting of citric, fumaric, succinic, latic, adipic, tartaric, malic, and combinations thereof.

9. The process of claim 8 wherein the food acid is citric acid.

10. The process of claim 1 wherein the food acid has a particle size distribution which is 97% minimum through 60 U.S. mesh.

11. The process of claim 10 the food acid particle size distribution is also 50% minimum through 100 U.S. mesh.

12. The process of claim 11 wherein the food acid is citric acid.

13. The process of claim 1 wherein the acid-coated reducing sugar is mixed with a water-soluble, alkaline, $CO_2$-generator.

14. The process of claim 13 wherein the $CO_2$-generator is selected from the group consisting of sodium carbonate, sodium bicarbonate, sodium sesquicarbonate, potassium carbonate, potassium bicarbonate, ammonium carbonate, ammonium bicarbonate, and combinations thereof.

15. The process of claim 1 wherein from 0.8 to 3% of a powdered water-insoluble spacer compound is present when the reducing sugar is mixed with the food acid.

16. The process of claim 15 wherein the spacer compound is calcium carbonate.

17. The process of claim 15 wherein the spacer compound has a particle size comparable to that of the food acid.

18. The dry food mix prepared in accordance with claim 1 wherein the mix comprises: 75-90% sucrose, 5-20% frucose, 4-12% powdered food acid by weight of fructose and sucrose, and up to 3% by weight calcium carbonate by weight of fructose and sucrose, wherein particles of fructose are surrounded by particles of the powdered acid and wherein the mix further contains at least on alkaline ingredient and the powdered acid particles physically prevent contact of the alkaline ingredients with the fructose.

19. The dry food mix of claim 18 which contains acetylated monoglycerides coated on the surface of the fructose particles.

20. The dry food mix of claim 18 which contains a water-soluble, alkaline $CO_2$-generator.

21. The dry food mix of claim 18 which contains magnesium oxide as an alkaline ingredient.

* * * * *